Sept. 20, 1938.　　　B. J. ANDERSON　　　2,130,991
ELECTRIC ALARM
Filed April 20, 1936
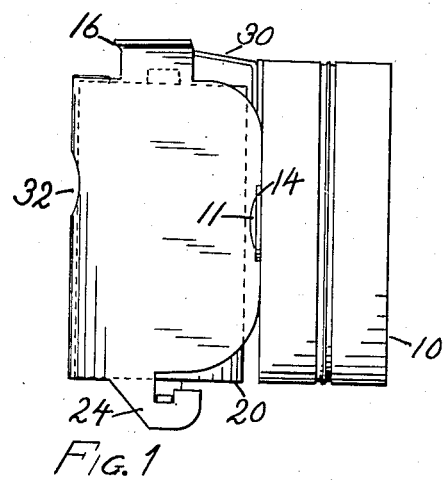
FIG. 1
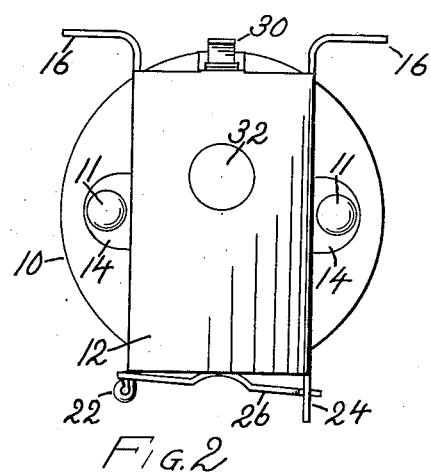
FIG. 2
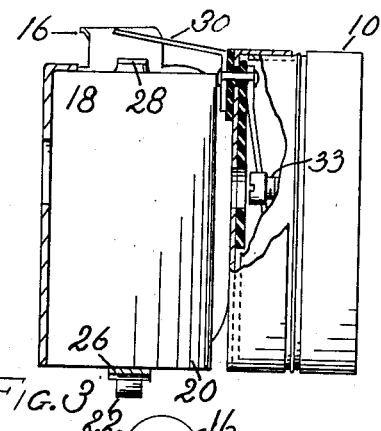
FIG. 3
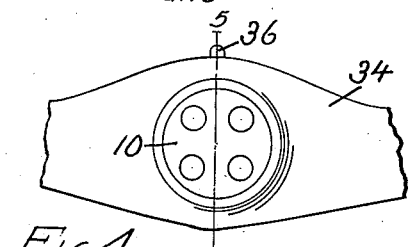
FIG. 4
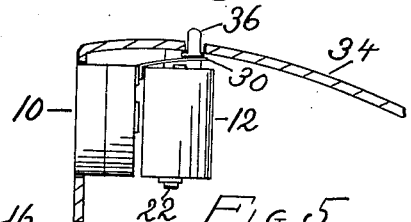
FIG. 5
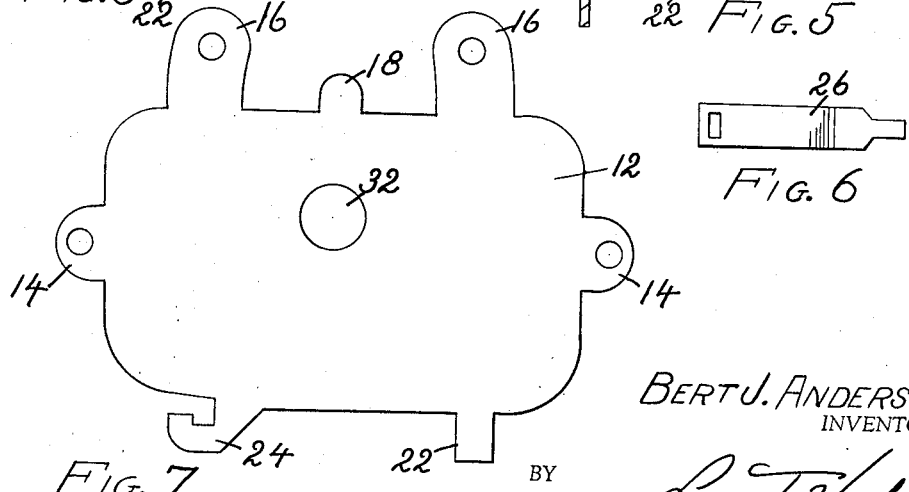
FIG. 6
FIG. 7
BERT J. ANDERSON
INVENTOR.
BY Leon T. Hooper
ATTORNEY.

Patented Sept. 20, 1938

2,130,991

UNITED STATES PATENT OFFICE 2,130,991

ELECTRIC ALARM

Bert J. Anderson, Hammond, Ind.

Application April 20, 1936, Serial No. 75,266

2 Claims. (Cl. 177—7)

This invention relates to an improved electric alarm especially adapted for use with juvenile vehicles, or the like, and has for one of its principal objects the provision of means for producing a sturdy and rugged device from a limited number of associated parts.

A still further important object of the improved electric alarm of this invention is the provision of means whereby a single stamping may be formed to support the entire device including the dry cell.

Still another and further important object of advantage resides in the provision of means for removably securing a dry cell in operable association with the device.

An additional object of importance and advantage is the provision of means for providing a double ground contact for the dry cell when in operable position.

The invention possesses other objects and features of importance and advantage, some of which, with the foregoing will be set forth in the following description.

The invention, in a preferred form, is illustrated in the accompanying drawing, wherein Fig. 1 is a side elevational view of an electric alarm which embodies the invention, Fig. 2 is a rear elevational view thereof, Fig. 3 is a side elevational view, parts thereof being broken away, Fig. 4 is a front elevational view of a portion of a handle bar with the improved electric alarm positioned therein, Fig. 5 is a section taken on line 5—5 of Fig. 4, Fig. 6 is a top plan view of the latch member, and Fig. 7 is a plan view of a blank used in the construction of the device.

As shown in the drawing:

The reference numeral 10 indicates in general an electrically operated buzzer or noise making device which in the preferred embodiment of the invention is of circular box shaped construction.

Positioned on the rear surface of the buzzer 10, preferably by rivets 11, is a stamping 12 which is U-shaped in cross section.

The stamping 12 has an apertured ear 14 extending from each end thereof as is clearly shown in Fig. 7. In preparation for assembly with the rest of the unit, the ears 14 are turned outwardly in order that the stamping 12 may be secured to the buzzer 10, as is best shown in Figs. 1 and 2.

Projecting upwardly from the top edge of the stamping 12 are apertured lugs 16 which are adapted to be employed in securing the assembled device to a vehicle. These lugs 16 may be turned outwardly, as shown in the drawing, or as desired to perform their function. It will thus be obvious that the improved electric alarm of this invention may be riveted, welded, or secured in any suitable manner to various kinds of vehicles.

Projecting inwardly from the top edge of the stamping 12 is a lug 18 which serves the double purpose of providing a stop and an auxiliary ground connection for the dry cell 20.

Extending downwardly from the bottom edge of the stamping 12 is a lug 22 and a hook 24. The lug 22 and the hook 24 together with the spring cross member 26 form a latch assembly for removably securing the dry cell in operable position.

The central portion of the cross member 26 is curved upwardly for the purpose of contacting and exerting a yielding pressure against the bottom of the dry cell. Inasmuch as the dry cell is forced upwardly against the lug 18 by the central portion of the leaf spring cross member a ground connection is established at the contact point at each end of the dry cell.

Projecting rearwardly from the buzzer 10 over the central terminal 28 of the dry cell 20 is a leaf spring conductor member 30. The conductor member 30 is normally spaced from the terminal 28 but is adapted to be moved into engagement with the terminal 28 to close the circuit between the dry cell 20 and the buzzer 10.

The stamping 12 is apertured at 32 to provide a means for reaching the adjustment screw 33 of the buzzer 10 when the dry cell is removed.

It will be apparent from the foregoing that herein is provided a compact and sturdy electric alarm which may be readily attached to any type of juvenile vehicle. The device may be secured within a suitable handle bar as shown in Figs. 4 and 5, or to practically any other type of vehicle.

In the preferred embodiment of the invention, as shown in the drawing, a push button 36 of insulating material is used to close the circuit between the dry cell 20 and the buzzer. Inasmuch as the stamping 12 and the casing of the buzzer 10 are both formed of sheet metal and because portions of the metal casing of the dry cell contact the stamping 12 an electric conducting medium is provided from the buzzer to the dry cell 20. The leaf spring conductor member 30 provides a means for conveying the current from the central terminal 28 on top of the dry cell 20 to the buzzer 10. This structure provides a complete electrical circuit between dry cell and buzzer as is best shown in Fig. 3.

I am aware that many changes may be made and numerous details of construction varied throughout a wide range without departing from the principles of this invention and I, therefore, do not purpose limiting the patent granted hereon otherwise than is necessitated by the prior art.

I claim as my invention:

1. A stamping in combination with a dry cell operated electric alarm, said stamping being U-shaped in cross section and having a plurality of securing lugs formed of portions of the top edge thereof, a lug extending inwardly from the top edge of the stamping, said lug being adapted to contact and provide a ground connection with the top edge of a dry cell, an apertured ear on each edge of the open side of said U-shaped stamping, a pair of downwardly projecting lugs formed of the lower edge of said U-shaped stamping, one of said lugs being notched to receive the end portion of a cross member, and a cross member hingedly secured to the other downwardly projecting lug.

2. A bracket formed of a single stamping and having a substantially cylindrical body portion, a window opening in the rear central part of said body portion, the longitudinal edges of said cylindrical body portion being in parallel spaced apart alignment, an apertured lug projecting outwardly from each spaced apart edge, a pair of lugs depending from the lower edge of said stamping, one of said lugs being notched, a latch member hingedly secured to the other depending lug, the latch member extending across the opening in the lower end of the substantially cylindrical stamping and entering the notch when in latched position, and an inwardly and a plurality of outwardly turned lugs formed of portions of the upper edge of said bracket.

BERT J. ANDERSON.